(12) United States Patent
Mukaihara et al.

(10) Patent No.: US 6,522,660 B1
(45) Date of Patent: Feb. 18, 2003

(54) METHOD AND SYSTEM FOR CONTROLLING RESERVATION OF DATA CHANNELS IN AUTOMATIC CALL DISTRIBUTION SERVICES

(75) Inventors: Masataka Mukaihara, Fukuoka (JP); Kazuo Mizuta, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/143,193

(22) Filed: Aug. 31, 1998

(30) Foreign Application Priority Data

Mar. 20, 1998 (JP) ............................................ 10-071527

(51) Int. Cl.[7] .............................. H04J 3/12; H04M 3/42
(52) U.S. Cl. ........................ 370/443; 370/524; 379/265; 379/273
(58) Field of Search ................................. 370/216, 225, 370/228, 230, 230.1, 231, 235, 237, 238, 351, 432, 442, 443, 462, 522, 524; 340/825.01, 2.1, 2.2, 2.21, 2.23, 3.1, 3.5, 3.52; 379/219, 220, 221, 229, 265, 266, 271, 272, 273, 309; 709/238, 239

(56) References Cited

U.S. PATENT DOCUMENTS

| | | | | |
|---|---|---|---|---|
| 4,720,850 A | * | 1/1988 | Oberlander et al. | 379/90 |
| 4,961,186 A | * | 10/1990 | Chandramouli et al. | 370/79 |
| 5,636,212 A | * | 6/1997 | Ikeda | 370/233 |
| 5,719,942 A | * | 2/1998 | Aldred et al. | 380/49 |
| 5,781,537 A | * | 7/1998 | Ramaswami et al. | 370/254 |
| 6,118,762 A | * | 9/2000 | Nomura et al. | 370/230 |

FOREIGN PATENT DOCUMENTS

| | | |
|---|---|---|
| JP | 63-305644 | 12/1988 |
| JP | 8-051480 | 2/1996 |

* cited by examiner

*Primary Examiner*—Alpus H. Hsu
(74) *Attorney, Agent, or Firm*—Katten Muchin Zavis Rosenman

(57) ABSTRACT

A channel reservation control system which reserves data channels in an appropriate manner to ensure the subsequent call set-up operations in automatic call distribution services. A channel allocation unit determines how many data channels should be reserved for a specific group of subscribers who may wish to use such reserved bandwidth. Then, a reservation request transmission unit makes a provisional reservation for as many data channels as determined by the channel allocation unit, and transmits a reservation request message to initiate the reservation of those data channels. Upon receipt of this reservation request message, a recipient-side reservation unit establishes channel reservation on the side of call recipients by securing the requested data channels for exclusive use by the specific group of subscribers. Then, a channel reservation acknowledgment unit returns a channel reservation acknowledgment message to notify the originator-side reservation unit about the data channels reserved by the recipient-side reservation unit. On the side of call originators, an originator-side reservation unit establishes the channel reservation by securing the data channels for exclusive use by the specific group of subscribers, in response to the channel reservation acknowledgment message.

11 Claims, 17 Drawing Sheets

53a B-CHANNEL RESERVATION REQUEST MANAGEMENT TABLE

| SUBSCRIBER IDENTIFIER SI (53a-1) | PROVISIONAL RESERVATION FLAG (53a-2) | | | | | | | |
|---|---|---|---|---|---|---|---|---|
| SI 1 | a1 | a2 | a3 | a4 | a5 | a6 | a7 | a8 |
| | a9 | a10 | a11 | a12 | a13 | a14 | a15 | a16 |
| | a17 | a18 | a19 | a20 | a21 | a22 | a23 | |
| SI 2 | -------- | | | | | | | |

FIG. 8

53c B-CHANNEL RESERVATION RE-
STRICTION MANAGEMENT TABLE

| MAXIMUM NUMBER OF B-CHANNELS TO BE RESERVED |
|---|

METHOD AND SYSTEM FOR CONTROLLING RESERVATION OF DATA CHANNELS IN AUTOMATIC CALL DISTRIBUTION SERVICES

BACKGROUND OF THE INVENTION

1. Field of the Invention

The present invention relates to a channel reservation control system, an originator-side channel reservation controller, a recipient-side channel reservation controller, and a method of controlling channel reservation. More particularly, the present invention relates to the following technical fields: a channel reservation control system which controls reservation of data channels in Integrated Services Digital Network (ISDN) facilities interconnecting electronic switching systems; an originator-side channel reservation controller which controls data channel reservation on the side of a calling party; a recipient-side channel reservation controller which controls data channel reservation on the side of a called party; and a method of controlling data channel reservation.

2. Description of the Related Art

Automatic Call Distribution (ACD) systems have been introduced to many organizations to efficiently handle incoming calls from their customers in telemarketing, customer services, or other phone intensive business functions. When incoming calls arrive, an electronic switching system with ACD capabilities automatically greets the callers and queues them for available service reception terminals.

FIG. 17 shows an example of such an ACD service system. Private Branch Exchanges (PBXs) 100, 110, and 120 are linked to different portions (N1, N2, and N3) of a public switched telephone network (PSTN) through PSTN transmission lines 200 as indicated by the broken lines. These PBXs 100, 110, and 120 are also linked with each other through ISDN transmission lines 30 as indicated by bold solid lines. Service reception terminals are divided into three ACD groups Gr100, Gr110, and Gr120 under the control of their local PBXs 100, 110, and 120, respectively. The first ACD group Gr100 consists of a plurality of service reception terminals 100*a* to 100*d*. Likewise, the second ACD group Gr110 consists of terminals 110*a* to 110*d*, and the third ACD group Gr120 includes terminals 120*a* to 120*d*.

The PBX 100, for instance, receives incoming calls addressed to its local ACD group Gr100, and it automatically delivers them to available service reception terminals being selected from among the service reception terminals 100*a* to 100*d*, thereby distributing the service workloads. When none of the service reception terminals 100*a* to 100*d* is found idle, the PBX 100 transfers the calls to other ACD Groups Gr110 and/or Gr120, so that the workloads will be distributed over the plurality of ACD groups and the incoming calls can be efficiently handled, not annoying the customers with busy signals.

As described above, the PBXs have to interact with each other to provide necessary information about the calling customer every time an incoming call is processed. This requirement justifies the use of ISDN transmission lines for connection between PBXs. Consider a call transfer from PBX 100 to PBX 110 via the ISDN transmission line 30*a*, for example. When setting up the call, the PBX 100 located on the side of the call originator first finds and obtains an idle data channel on an ISDN transmission line 30*a* interconnecting the PBXs 100 and 110. The PBX 100 then notifies the remote PBX 110 about the data channel obtained, and in response to this notification, the PBX 110 makes a hunting of the same data channel. In this way, the two PBXs 100 and 110 establish a call connection after negotiating which data channel to use.

In normal situations, the ISDN transmission line 30*a* is shared by a plurality of general subscribers for a variety of service purposes, but not dedicated to the ACD call transfer. Therefore, it may not always be possible for the PBXs 100 and 110 to obtain a data channel and set up a call connection, when there is a large volume of traffic between them. In such circumstances, the PBXs are unable to provide satisfactory ACD services.

Imagine another situation where the PBX 100 has obtained an idle data channel, but unfortunately, that data channel is not operational on the side of the PBX 110. This can happen when, for example, one electronic switching system (i.e., PBX) is under the maintenance activities and thus some of its data channels are unusable. In this case, the ACD service does not work, because no call connections can be established between the PBXs 100 and 110. Such problem situations could be avoided by allocating a wider bandwidth to the ISDN transmission line 30*a* between the PBXs 100 and 110 so that the expected volume of incoming calls be handled. This solution, however, would result in an intolerable increase in system costs.

Researchers have proposed several ideas to avoid the above degradation in ACD services. For example, Japanese Patent Application Laid-open Publication No. 8-51480 (1996) discloses a technique to ensure the successful hunting of data channels by previously reserving them for exclusive use, where the channel reservation process is performed by an electronic switching system located on the side of call originators. This proposed technique, however, is not based on a true negotiation between two switching systems concerned, and therefore, it does not guarantee the successful establishment of call connections, even if they are attempted with the reserved channels.

Further, in the above-described conventional system, the reserved data channels will be canceled once they are allocated to some subscribers. In other words, a reservation made for a specific subscriber is automatically terminated at the end of a subsequent call. As such, the conventional system does not allow any particular channel reservation to be maintained for a long time.

Still another problem with the conventional system is that the system is designed to reserve a predetermined number of data channels, but it does not provide flexibility in this area. When the predetermined number is too small, actual incoming calls may sometimes overwhelm the system's capacity. When, in turn, the predetermined number is too large, the resultant excessive channel reservation will hamper the access from other ordinary subscribers, avoiding efficient use of the ISDN transmission lines 30. In actuality, the traffic loads in ACD services vary with time. However, the conventional system design does not take this nature of ACD services into consideration.

SUMMARY OF THE INVENTION

Taking the above into consideration, a first object of the present invention is to provide a system for reserving data channels in an appropriate manner to ensure the connection set-up operations in a telecommunications service feature which has to continually handle a number of incoming calls, as in ACD services.

A second object of the present invention is to provide an originator-side channel reservation controller which reserves data channels in an appropriate manner to ensure the connection set-up operations.

Further, a third object of the present invention is to provide a recipient-side channel reservation controller which reserves data channels in an appropriate manner to ensure the connection set-up operations.

Moreover, a fourth object of the present invention is to provide a method of reserving data channels in an appropriate manner to ensure the connection set-up operations.

To accomplish the first to third objects, according to the present invention, there is provided a system for controlling reservation of data channels to be used for automatic distribution of incoming calls. This system comprises an originator-side channel reservation controller and a recipient-side channel reservation controller. The originator-side channel reservation controller comprises the following elements:

- a channel allocation unit which determines the number of data channels to be reserved for a specific group of subscribers who may use the data channels;
- a reservation request transmission unit which makes a provisional reservation for as many data channels as determined by the channel allocation unit and transmits a reservation request message to request reservation of the data channels; and
- an originator-side reservation unit which establishes the channel reservation on the side of call originators by securing the data channels for exclusive use by the specific group of subscribers, in response to a channel reservation acknowledgment message.

On the other hand, the recipient-side channel reservation controller comprises the following elements:

- a recipient-side reservation unit which establishes the channel reservation on the side of call recipients by securing the data channels for exclusive use by the specific group of subscribers, in response to the reservation request message sent from the reservation request transmission unit; and
- a channel reservation acknowledgment unit which transmits the channel reservation acknowledgment message to the originator-side reservation unit to report a result status of the channel reservation made by the recipient-side reservation unit.

To accomplish the fourth object, according to the present invention, there is provided a method of controlling reservation of data channels to be used for automatic distribution of incoming calls. This method comprises the following steps:

(a) determining the number of data channels to be reserved on the side of call originators to handle incoming calls from a specific group of subscribers;

(b) making a provisional reservation of as many data channels as determined in the step (a) and issuing a reservation request message to the side of call recipients;

(c) reserving the requested data channels on the side of call recipients for exclusive use by the specific group of subscribers, in response to the reservation request message;

(d) sending a result status message to inform the side of call originators about the data channels that have been reserved in the step (c);

(e) establishing the channel reservation on the side of call originators by securing the data channels for exclusive use by the specific group of subscribers, in response to the result status message received from the side of call recipients.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a diagram which shows a B-channel reservation request management table;

FIG. 13 is a diagram which shows a B-channel reservation restriction management table;

DESCRIPTION OF THE PREFERRED EMBODIMENTS

Several embodiments of the present invention will be described below with reference to the accompanying drawings.

Figure 1:
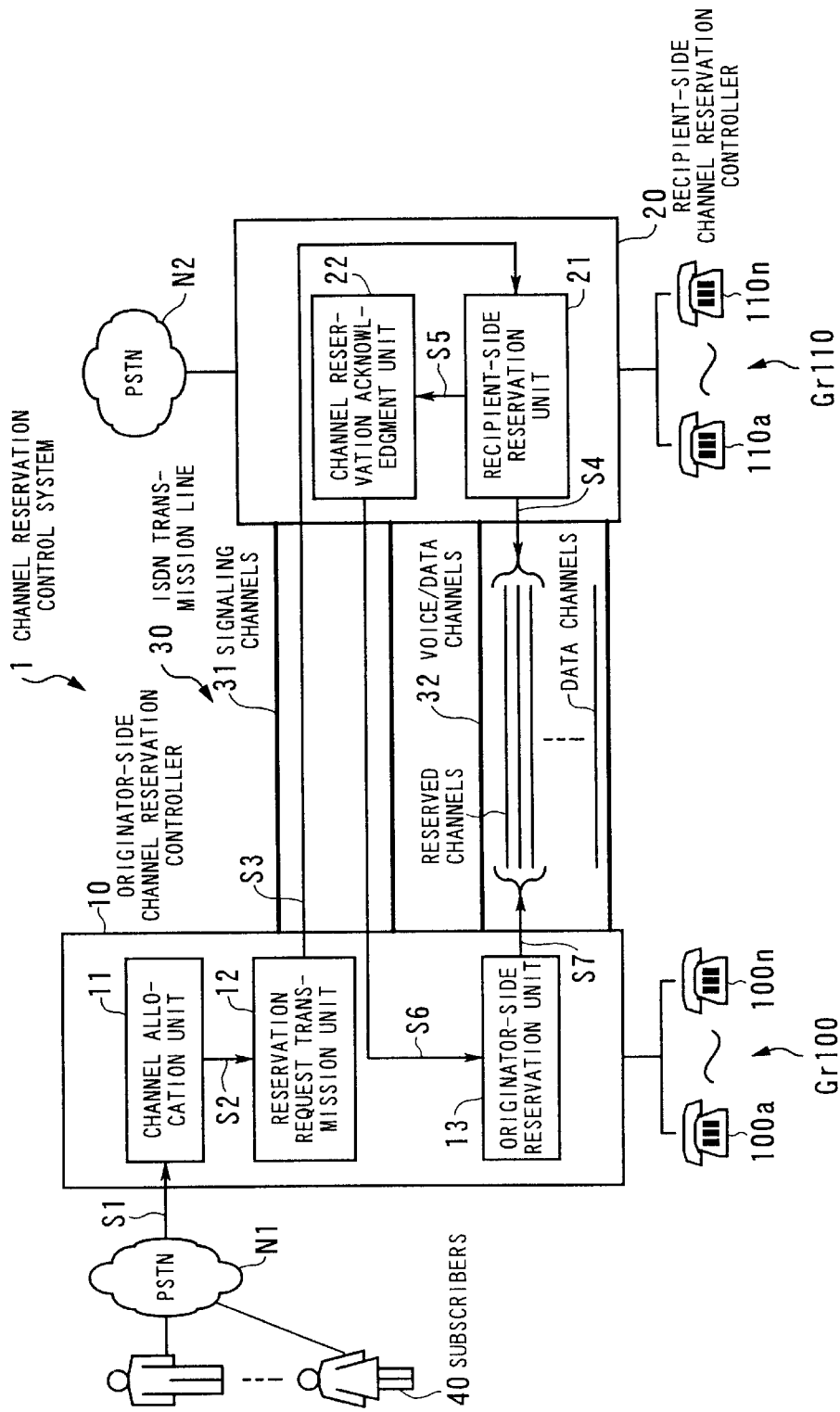
FIG. 1 is a conceptual view of a channel reservation control system according to the present invention.

FIG. 1 is a conceptual view of a channel reservation control system according to the present invention. This channel reservation control system 1 comprises an originator-side channel reservation controller 10 and a recipient-side channel reservation controller 20 which cooperate to control a process of data channel reservation. In actuality, these two controllers are implemented as integral part of electronic switching systems used.

Note here that two modifiers "originator-side" and "recipient-side" are used to distinguish two controllers (or switching systems) situated at separate sites. The controller 10 is said to be "on the side of originators" or "on the originator-side" for short, since it is near to subscribers 40 who originate calls. In contrast to this, the other controller 20 is said to be "on the side of recipients" or "on the recipient-side." This is because it will finally receive and handle the calls transferred from the originator-side channel reservation controller 10, while terminals 110a to 110n are true recipients.

The originator-side channel reservation controller 10 is linked to a portion of a public switched telephone network (PSTN) N1, while the recipient-side channel reservation controller 20 is linked to another PSTN portion N2. Further, the two controllers 10 and 20 are interconnected by an ISDN transmission line 30, which includes signaling channels 31 and voice/data channels 32.

The originator-side channel reservation controller 10 manages a plurality of service reception terminals 100a to 100n that belong to an ACD group Gr100. Similarly, the recipient-side channel reservation controller 20 manages a plurality of service reception terminals 110a to 110n that belong to another ACD group Gr110.

In the originator-side channel reservation controller 10, a channel allocation unit 11 determines the number of data channels to be reserved for a specific group of subscribers 40 who may wish higher availability of services and thus require the reservation of data channels. (Here, the term "data channels" is used to refer to a part of the voice/data channels 32, whose payload includes voice, data, or any other types of information.) A reservation request transmission unit 12 makes a provisional reservation for as many data channels as determined by the channel allocation unit 11, and then transmits a reservation request message to the recipient-side channel reservation controller 20.

On the far end of the ISDN transmission line 30, a recipient-side reservation unit 21 in the recipient-side channel reservation controller 20 responds to the reservation request message by securing the requested data channels so that the subscribers 40 can use them in an exclusive manner (i.e., the system never allocates them for calls from the PSTN N2, for example). A channel reservation acknowledgment unit 22, another integral part of the recipient-side controller 20, sends a reservation acknowledgment message back to the originator-side channel reservation controller 10 to report which data channels have been successfully reserved. Upon receipt of this reservation acknowledgment message, an originator-side reservation unit 13 in the controller 10 secures the data 20 channels for exclusive use by the subscribers 40, not allowing them to be allocated to other subscribers on the same PSTN N1.

With reference to the step numbers S1 to S7 shown in FIG. 1, the following section will focus on the sequence outlined above.

(S1) The channel allocation unit 11 is activated to reserve data channels for a specific group of subscribers 40 who make access to the ACD system via the PSTN N1.

(S2) The channel allocation unit 11 determines how many data channels should be reserved for the subscribers 40. The resultant number of data channels is then informed to the reservation request transmission unit 12.

(S3) The reservation request transmission unit 12 makes a provisional reservation for as many data channels as determined in step S2, and transmits a reservation request message to the recipient-side channel reservation controller 20.

(S4) The recipient-side reservation unit 21 responds to the reservation request message by securing the requested data channels so that they will be allocated exclusively to the subscribers 40.

(S5) The recipient-side reservation unit 21 informs the channel reservation acknowledgment unit 22 that the data channels have been secured on the side of recipients.

(S6) The channel reservation acknowledgment unit 22 returns a reservation acknowledgment message to notify the originator-side channel reservation controller 10 about the reserved data channels.

(S7) Upon receipt of the reservation acknowledgment message, the originator-side reservation unit 13 secures the data channels on the side of originators for exclusive allocation to the subscribers 40.

As described above, the network monitoring system 1 of the present invention reserves data channels, which are referred to as "B-channels" in the context of ISDN, in such a way that two controllers (i.e., two switching systems) secure the channels on both of the originator-side and the recipient-side. This approach ensures prompt transfer of incoming calls to the recipient-side channel reservation controller 20, when the service reception terminals 100a to 100n of the ACD group Gr100 are all busy. This is because an appropriate number of B-channels have been reserved in advance and are ready for use in the call transfer operation.

Although not shown in FIG. 1, the originator-side channel reservation controller 10 has more functional elements for enhanced capabilities. They include: an alternative route reservation unit, a reservation restriction unit, a reservation cancellation unit, and a reservation continuation unit. The details of these units will be presented in later part of this description.

In the above section, the two channel reservation controllers 10 and 20 have been explained as separate devices, one on the originator-side and the other on the recipient-side. In actual implementations, however, both devices are realized as integral functions of each individual electronic switching system, as will be described below.

Figure 2:
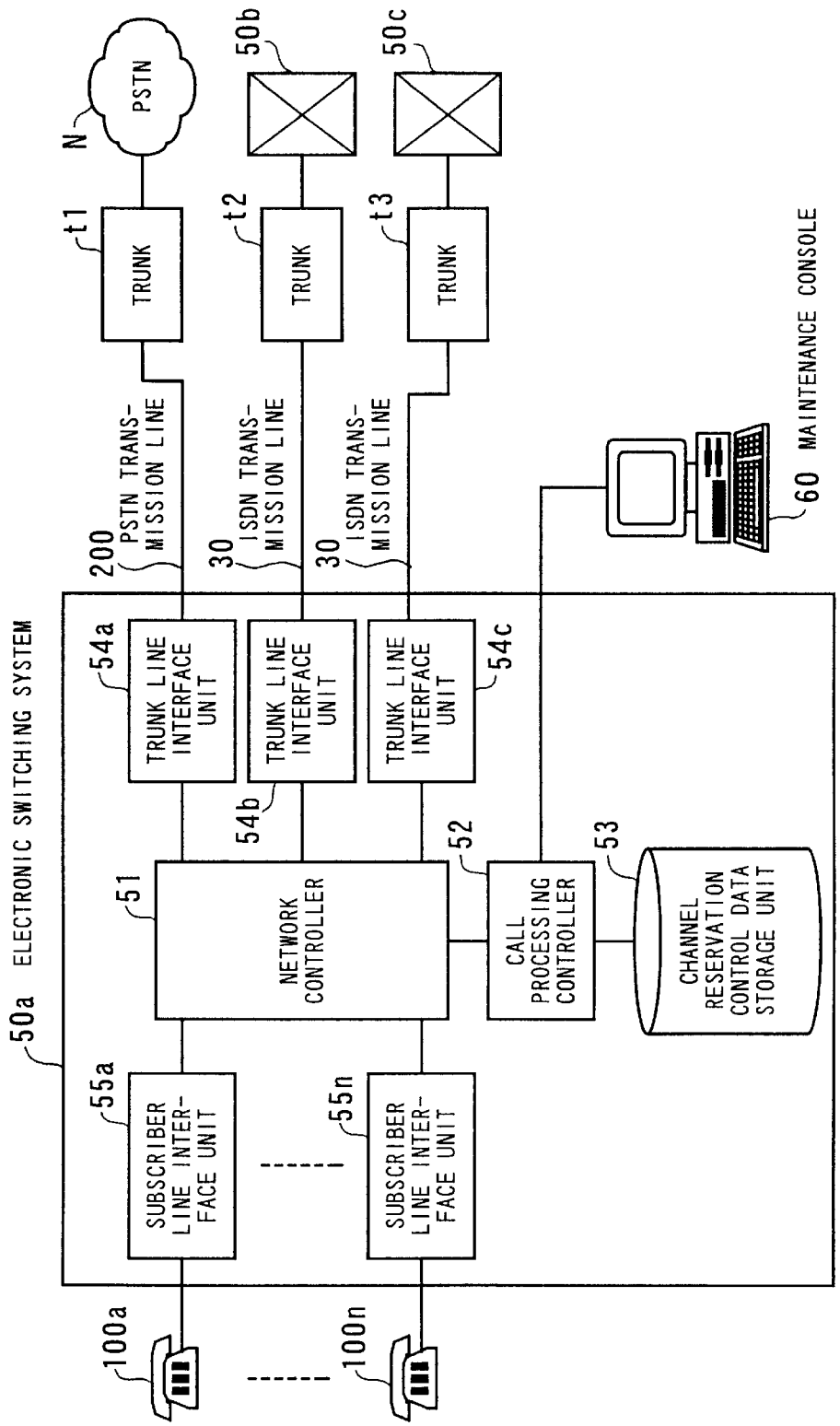
FIG. 2 is a diagram which shows a proposed configuration of an electronic switching system.

FIG. 2 shows a proposed configuration of an electronic switching system. This electronic switching system 50a is connected to a public switched telephone network N through a trunk t1, as well as being linked to other electronic switching systems 50b and 50c through trunks t2 and t3, respectively. The electronic switching system 50a is also coupled to its local ACD group organized by a plurality of service reception terminals 100a to 100n.

The electronic switching system 50a is equipped with a trunk line interface unit 54a to accommodate a PSTN transmission line 200 for controlling connectivity to the PSTN N through the trunk t1. Similarly, trunk line interface units 54b and 54c are disposed in the electronic switching system 50a to accommodate an ISDN transmission line 30 for controlling connectivity to the other electronic switching systems 50b and 50c through the trunks t2 and t3. On the other hand, subscriber line interface units 55a to 55n provide interface with the service reception terminals 100a to 100n, which form a specific ACD group. A network controller 51 switches the connections between the trunk line interface units 54a to 54c and the subscriber line interface units 55a to 55n. This network controller 51 is under the control of a call processing controller 52. Being linked to a channel reservation control data storage unit 53 and a maintenance console 60, this call processing controller 52 plays a central role in the electronic switching system 50a, providing its total control including channel reservation control functions. Note here that what have been explained as the originator-side channel reservation controller 10 and recipient-side channel reservation controller 20 are actually implemented in the call processing controller 52.

The channel reservation control data storage unit 53 stores parameters necessary for channel reservation control and other service features. It also maintains several management tables as will be described later. Through the maintenance console 60, the call processing controller 52 provides an operator with useful information for maintenance of the electronic switching system 50a. The maintenance console 60 is also used by the operator to enter instructions to the electronic switching system 50a, when, for example, he/she sets parameters concerning the channel reservation.

Figure 3:
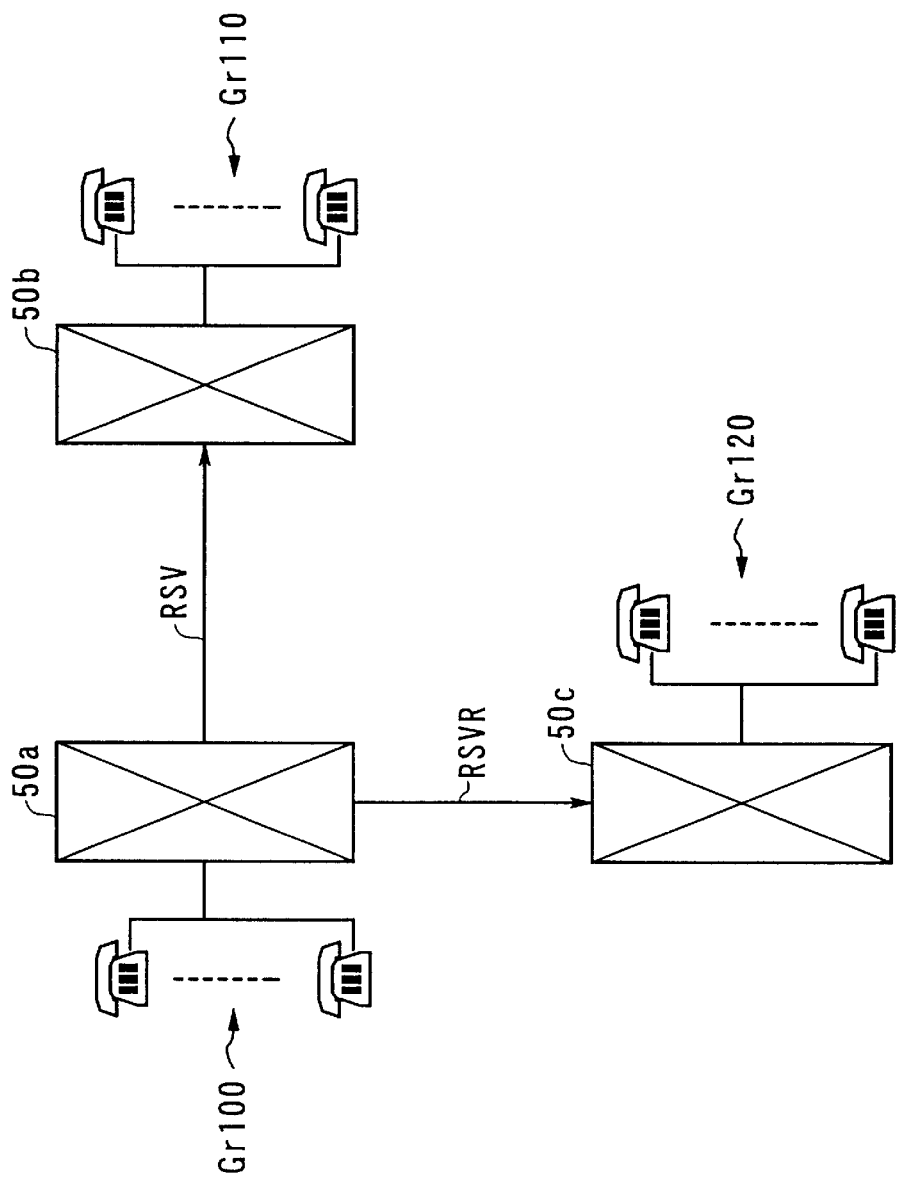
FIG. 3 is a diagram which shows a default reservation route and an alternative destination.

Referring now to FIG. 3, the next section will present the concept of an alternative route reservation unit. If the recipient-side channel reservation controller 20 is unable to reserve sufficient B-channels as required, the alternative route reservation unit then tries to compensate for the shortage by selecting B-channels from among those extending to another channel reservation controller that has been nominated beforehand as an alternative destination.

FIG. 3 shows a simplified system configuration where three electronic switching systems 50a, 50b, and 50c manage their local ACD groups Gr100, Gr110, and Gr120, respectively. The default route to choose in this system is a reservation route RSV, which interconnects the electronic switching systems 50a and 50b. Upon request, the electronic switching system 50a will attempt to reserve B-channels on this default reservation route RSV at first. If it failed to reserve a sufficient number of B-channels, the electronic switching system 50a then would try to find vacant B-channels on a predetermined alternative route destined for the electronic switching system 50c. This path to reach the electronic switching system 50c is referred to as an "alternative reservation route," RSVR.

The number N of B-channels that have to be reserved is obtained by $$N = A - B, \quad (1)$$

where A is a predetermined threshold and B is a variable representing the number of service reception terminals that are ready to accept incoming calls from subscribers. Equation (1) serves as a criterion to determine whether to initiate a channel reservation process with respect to the default reservation route RSV. There is another equation to calculate a number ZR to determine whether to initiate a channel reservation process with respect to the alternative reservation route RSVR. Because of its similarity to Equation (1), the details are omitted here, while some specific examples will be presented later.

The channel reservation control system 1 does not initiate a reservation control process for the default reservation route RSV, while the primary index value N is below zero (i.e., N<0). The process will be activated when N has reached or exceeded zero (i.e., N≧0). Likewise, the channel reservation control for the alternative reservation route RSVR does not start until the number NR becomes zero or exceeds zero (i.e., NR≧0).

Consider, for example, that the threshold A=5 is given to the ACD group Gr100 consisting of twenty service reception terminals, and twelve terminals among them are idle at present (i.e., B=12). The channel reservation process is not initiated in this situation, because N is below zero. That is, the ACD system does not necessitate any channel reservation while the number B of idle terminals is in a range from six to twenty and thus N<0. When, in turn, the number B has decreased to four, the combination of parameters A=5 and B=4 results in a condition of N>0. The reservation control system 1 recognizes that the call reception by the ACD group Gr100 is about to saturate, when the number B of idle terminals is in a range from five to zero and thus N>0. Therefore, it triggers a channel reservation process to secure necessary channels on the primary reservation route RSV reaching to the electronic switching system 50b.

Consider another situation where N=5−B, NR=3−B and B=4. In this case, the channel reservation control system 1 will reserve B-channels on the route RSV from the electronic switching system 50a to the electronic switching system 50b, because N has a positive value. However, with respect to the alternative reservation route RSVR from the electronic switching system 50a to the alternative destination, or the electronic switching system 50c, no channel reservation is made for the time being, because SR is below zero.

As still another example, think of a situation where N=5−B, NR=3−B, and B=2. Because both N and NR are positive in this situation, the channel reservation control system 1 first attempts to reserve B-channels on the default reservation route RSV, and if this attempt was not satisfactory, it then would try to reserve B-channels on the alternative reservation route RSVR.

As illustrated above, the activation of the channel reservation process is controlled in accordance with some predefined criteria, including the testing of N and NR. The next section will explain how the channel allocation unit 11 manages those criteria.

Figure 4:
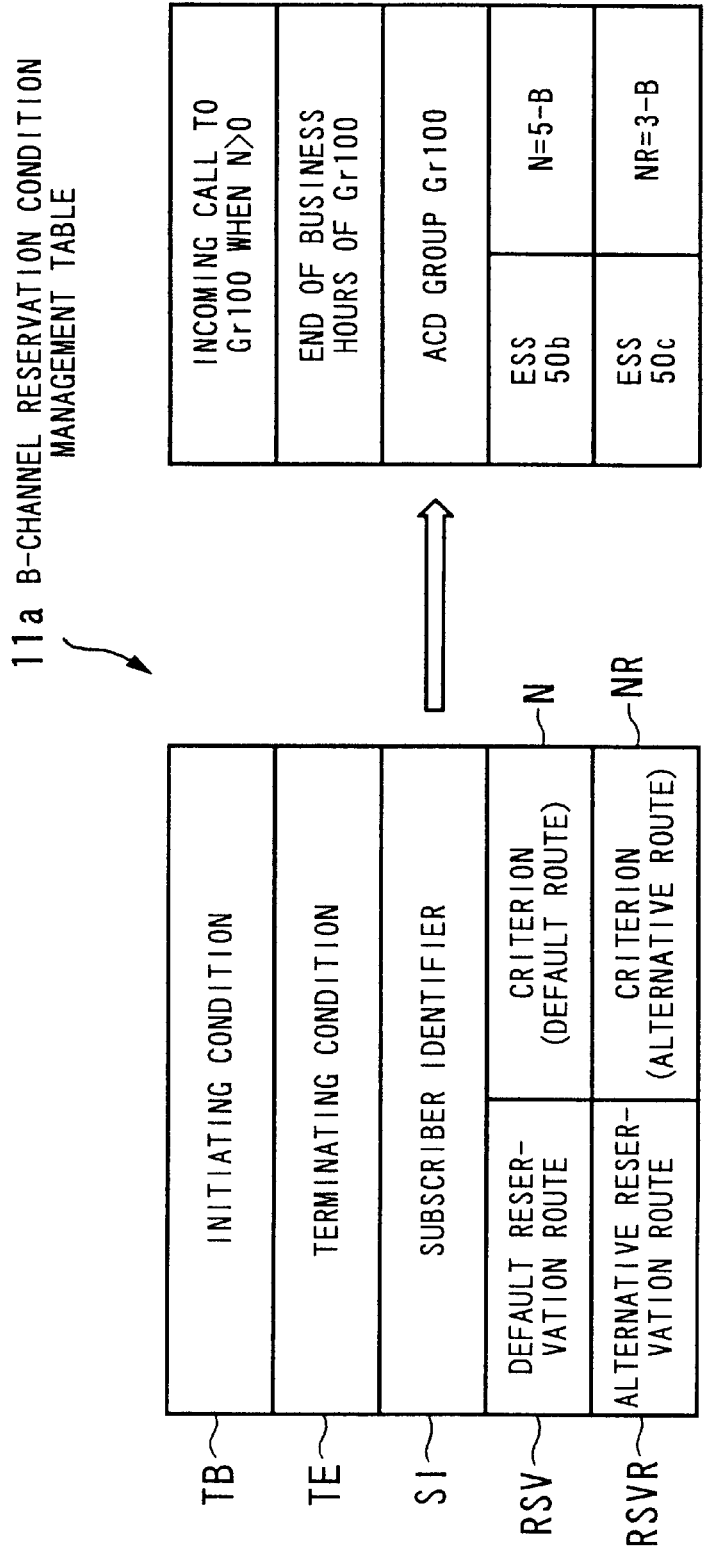
FIG. 4 is a diagram which shows a B-channel reservation condition management table.

FIG. 4 shows a B-channel reservation condition management table 11a stored in the channel reservation control data storage unit 53. This B-channel reservation condition management table 11a contains the following data fields:

Initiating condition TB and Terminating condition TE which describe when channel reservation should be initiated and terminated,
Subscriber identifier SI which identifies a specific group of subscribers who use reserved B-channel,
Default reservation route RSV,
Alternative reservation route RSVR, and
Reservation control criteria which include the definitions of N and NR to determine whether to initiate reservation control.
A specific example of the B-channel reservation condition management table 11a is shown on the right hand side of FIG. 4, which provides the following contents:
Initiating condition TB
 . . . Incoming calls to ACD group Gr100 when N≧0
Terminating condition TE
 . . . End of business hours of ACD group Gr100
Subscriber identifier SI
 . . . ACD group Gr100
Default reservation route RSV
 . . . Route to the electronic switching system (ESS) 50b
Alternative reservation route RSVR
 . . . Route to the electronic switching system (ESS) 50c
Reservation control criterion (default route)
 . . . N=5−B
Reservation control criterion (alternative route)
 . . . NR=3−B In this way, the channel allocation unit 11 is configured to determine the number of required channels in accordance with the initiating and terminating conditions registered in the B-channel reservation condition management table 11a. This feature allows the system to adaptively allocate as many channels as necessary to accept incoming calls whose volume may vary with time.

Figure 5:
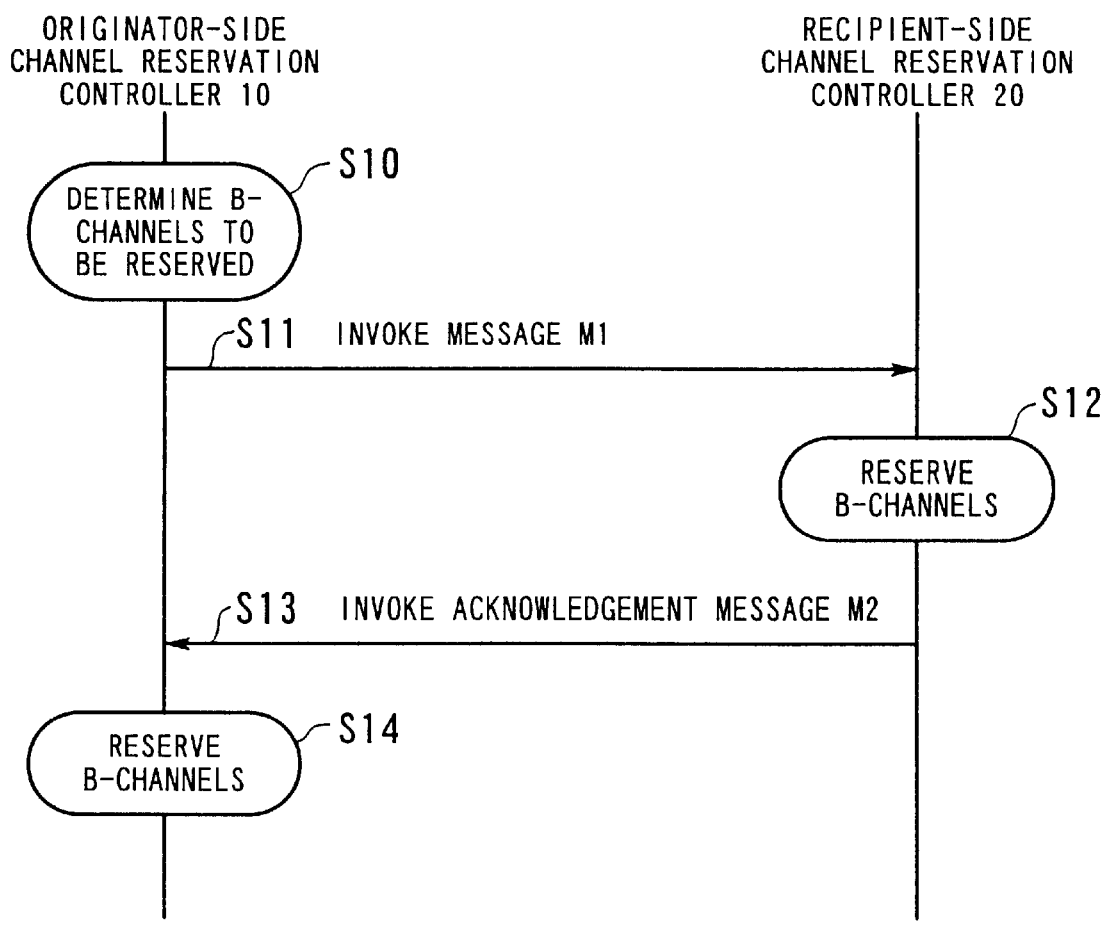
FIG. 5 is a sequence diagram which shows transactions between an originator-side channel reservation controller and a recipient-side channel reservation controller.

Referring now to FIG. 5, the following section will describes transactions between the originator-side channel reservation controller 10 and the recipient-side channel reservation controller 20.

FIG. 5 is a sequence diagram showing a process of channel reservation, where an Invoke message is issued to request a reservation and an Invoke Acknowledgement message is used to return the result status of the requested reservation. Invoke messages are defined in the layer 3 protocol recommendations TPH-2256 as part of the ISDN specifications.

(S10) After the operator sets up the B-channel reservation condition management table 11a through the maintenance console 60, the channel allocation unit 11 determines the number of required channels.

(S11) The reservation request transmission unit 12 sends an Invoke message M1 to the recipient-side channel reservation controller 20, which message serves as the reservation request message mentioned earlier.

(S12) The recipient-side reservation unit 21 receives this Invoke message M1 and responds to it by securing the requested B-channels on the side of call recipients.

(S13) The channel reservation acknowledgment unit 22 returns the result status to the originator-side channel reservation controller 10 by sending an Invoke Acknowledgement message M2. This message serves as the reservation acknowledgment message mentioned earlier.

(S14) The originator-side reservation unit 13 secures the same B-channels on the side of the call originators, in response to the Invoke Acknowledgement message M2 received.

Figure 6:
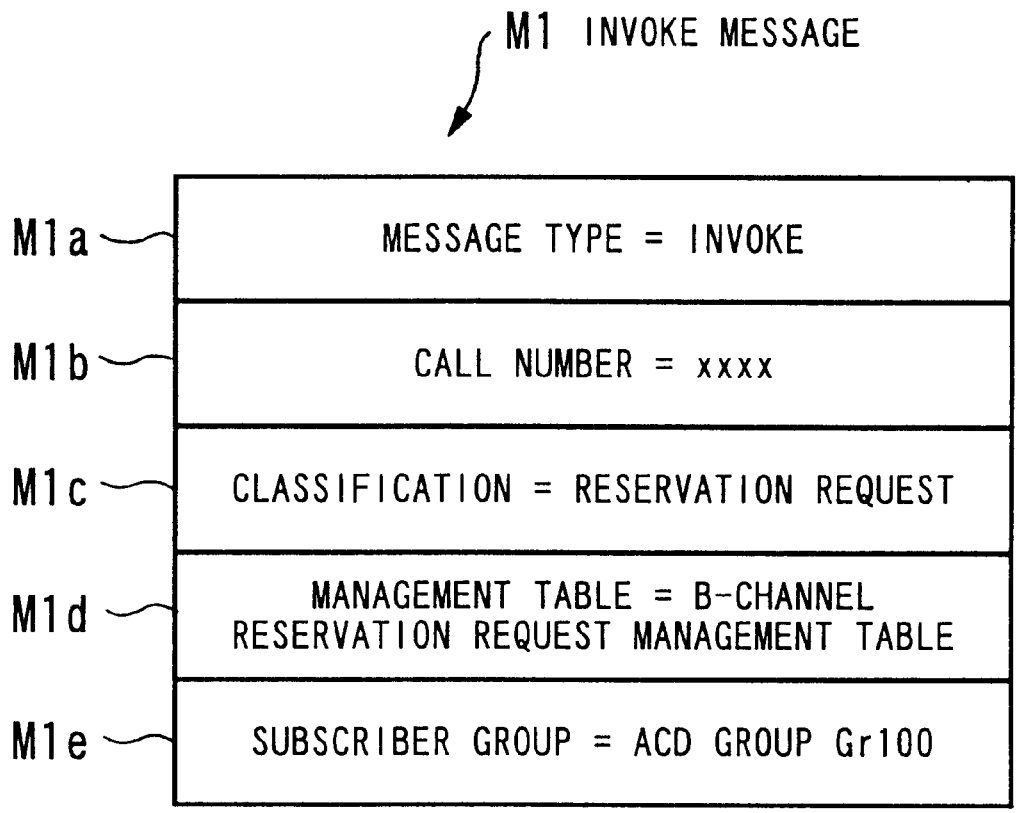
FIG. 6 is a diagram which illustrates the contents of an Invoke message.

FIG. 6 shows the contents of an Invoke message M1. This message M1 consists of a message type field M1a, a call number field M1b, a classification field M1c, a management table field M1d, and a subscriber group field M1e. More specifically, the message type field M1a contains a code representing "Invoke" messages, and the call number field M1b holds a specific call number "xxxx." The classification field M1c indicates that the channel reservation is being requested. The management table field M1d contains a B-channel reservation request management table, which will be described later. The subscriber group field M1e indicates that the ACD group Gr100 is concerned.

Figure 7:
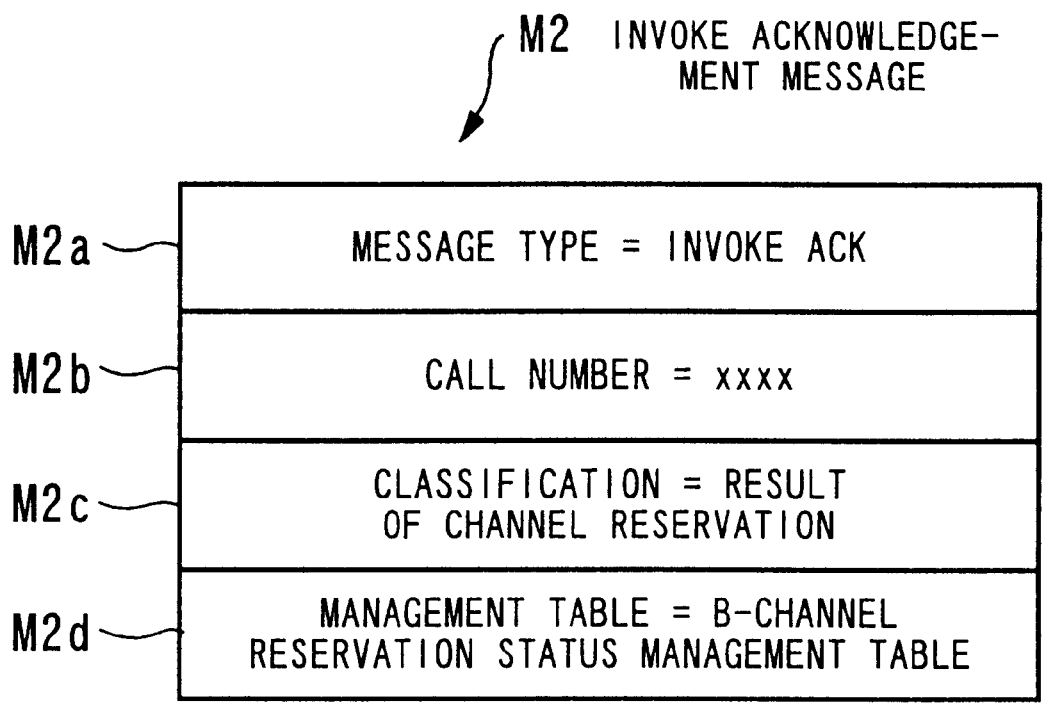
FIG. 7 is a diagram which illustrates the contents of an Invoke Acknowledgement message.

FIG. 7 shows the contents of the Invoke acknowledgement message M2, which consists of a message type field M2a, a call number field M2b, a classification field M2c, and a management table field M2d. More specifically, the message type field M2a contains a code representing "Invoke Acknowledgment" messages, and the call number field M2b indicates a specific call number "xxxx." The classification field M2c shows that this message is sending the result of the channel reservation attempted. The management table field M2d contains a B-channel reservation status management table, which will be described later.

FIG. 8 shows a B-channel reservation request management table 53a stored in the channel reservation control data storage unit 53. For each individual subscriber identifier SI 53a-1, this B-channel reservation request management table 53a manages provisional reservation flags 53a-2 that indicate for which B-channels the originator-side channel reservation controller 10 has made provisional reservations. Take the first row of this table 53a for instance. The value "SI1" in the subscriber identifier field 53a-1 represents a specific ACD group having twenty-three service reception terminals. The i-th provisional reservation flag ai corresponds to the i-th B-channel Bi, where i is an integer ranging from 1 to 23. This provisional reservation flag ai, when it is set to "1," indicates that the corresponding B-channel Bi has been provisionally reserved. The flag ai remains "0" while the B-channel Bi is not reserved. Here, the reservation request transmission unit 12 requests channel reservation when the number of B-channels specified in the B-channel reservation request management table 53a is greater than the number of B-channels that are reserved at present.

Figure 9:
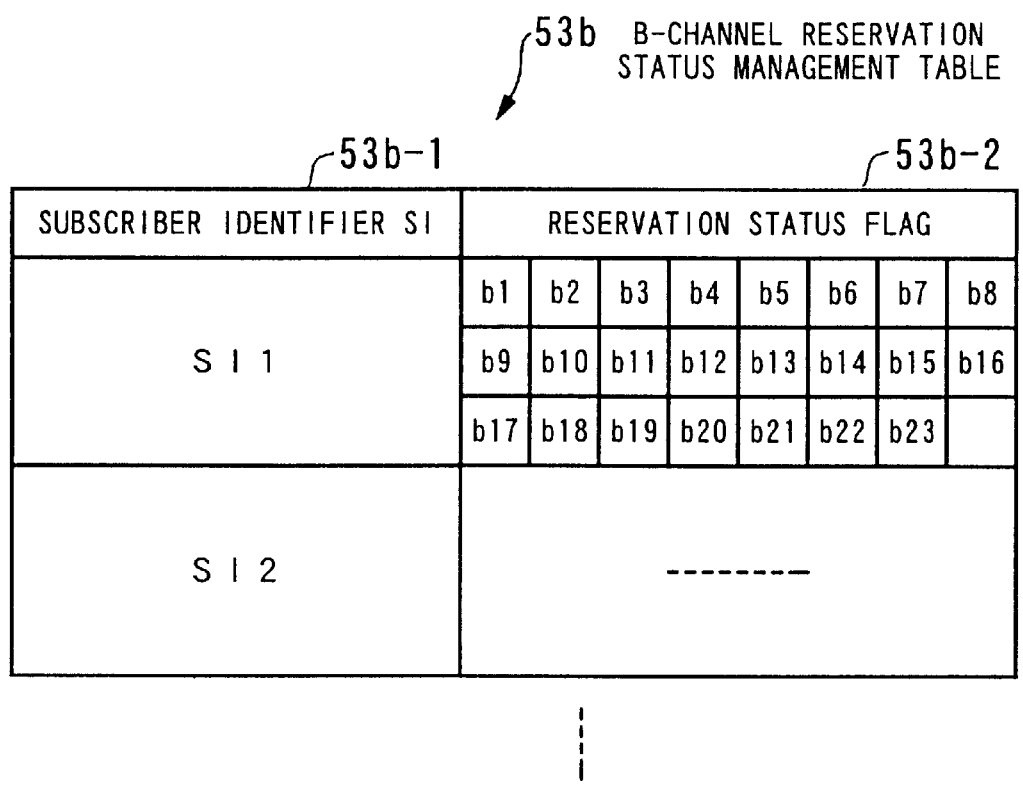
FIG. 9 is a diagram which shows a B-channel reservation status management table.

FIG. 9 shows a B-channel reservation status management table 53b stored in the channel reservation control data storage unit 53. For each individual subscriber identifier SI 53a-1, this B-channel reservation status management table 53b manages reservation status flags 53b-2 that indicate which B-channels the recipient-side channel reservation controller 20 has secured.

Each reservation status flag bi corresponds to a B-channel Bi, where i is an integer ranging from 1 to 23. This reservation status flag bi, when it is set to "1," indicates that the corresponding B-channel Bi is being reserved. The flag bi remains "0" while the B-channel Bi is not reserved. Although the originator-side channel reservation controller 10 also maintains the same kind of status management table, the explanation is omitted here.

Figure 10:
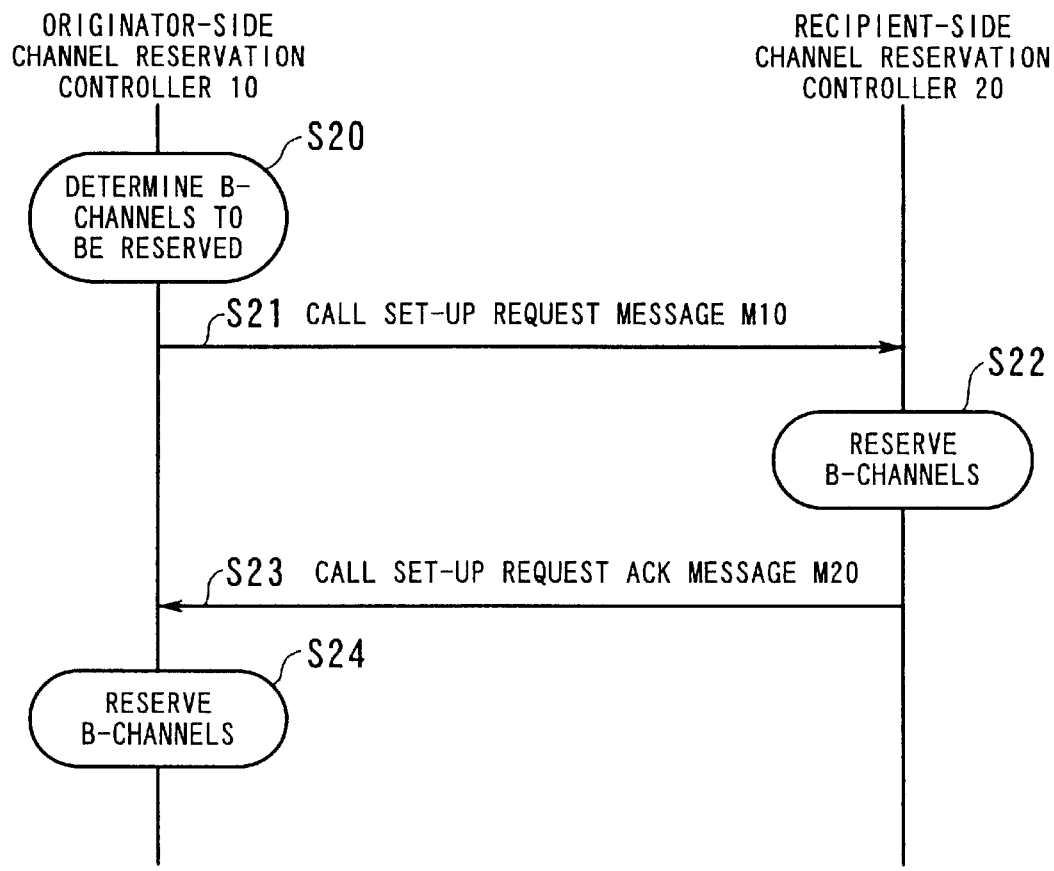
FIG. 10 is another sequence diagram which shows transactions between an originator-side channel reservation controller and a recipient-side channel reservation controller.

Referring now to FIG. 10, the following section will describe another example of transactions between the originator-side channel reservation controller 10 and the recipient-side channel reservation controller 20, where call set-up messages are used to control the process of channel reservation, besides establishing a connection for each incoming call.

FIG. 10 is a sequence diagram showing a process of channel reservation. Here, a call set-up request message serves as the aforementioned reservation request message, while a call set-up request acknowledgment message is used to return the result status of the requested reservation.

(S20) After the operator has set up the B-channel reservation condition management table 11a through the maintenance console 60, the channel allocation unit 11 determines the number of required B-channels.

(S21) The reservation request transmission unit 12 sends a call set-up request message M10 to the recipient-side channel reservation controller 20, which message serves as the reservation request message mentioned earlier.

(S22) The recipient-side reservation unit 21 receives this call set-up request message M10 and responds to it by securing the requested B-channels on the side of call recipients.

(S23) The channel reservation acknowledgment unit 22 returns the result status to the originator-side channel reservation controller 10 by sending a call set-up request acknowledgment message M20. This message serves as the reservation acknowledgment message mentioned earlier.

(S24) The originator-side reservation unit 13 also secures the requested B-channels on the side of the call originators, in response to the call set-up request acknowledgment message M20.

Figure 11:
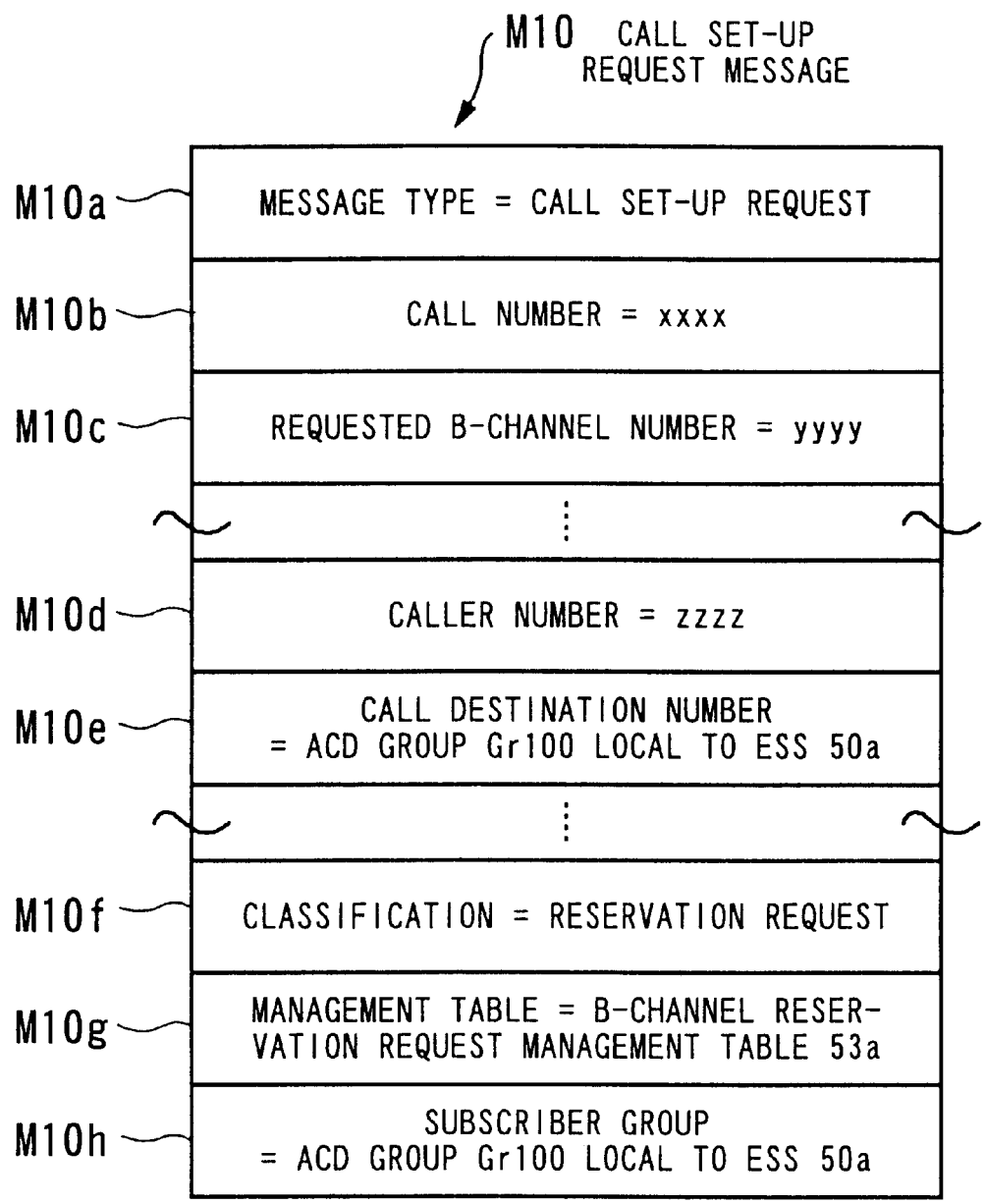
FIG. 11 is a diagram which shows the contents of a call set-up request message.

FIG. 11 shows the contents of the call set-up request message M10, which consists of a message type field M10a, a call number field M10b, a requested B-channel number field M10c, a call originator number field M10d, a call destination number field M10e, a classification field M10f, a management table field M10g, and a subscriber group field M10h. In a specific example of FIG. 11, the message type field M10a contains a code representing "call set-up request" messages. The call number field M10b indicates a specific call number "xxxx," and the requested B-channel number field M10c holds a value of "yyyy." The call originator number field M10d has a specific value of "zzzz," while the call destination number field M10e indicates that the call is destined for the ACD group Gr100 local to the electronic switching system (ESS) 50a. The classification field M10f shows that the message is intended to request channel reservation. The management table field M10g contains a B-channel reservation request management table 53a. The subscriber group field M10h suggests that the ACD group Gr100 local to the electronic switching system 50a is concerned.

Figure 12:
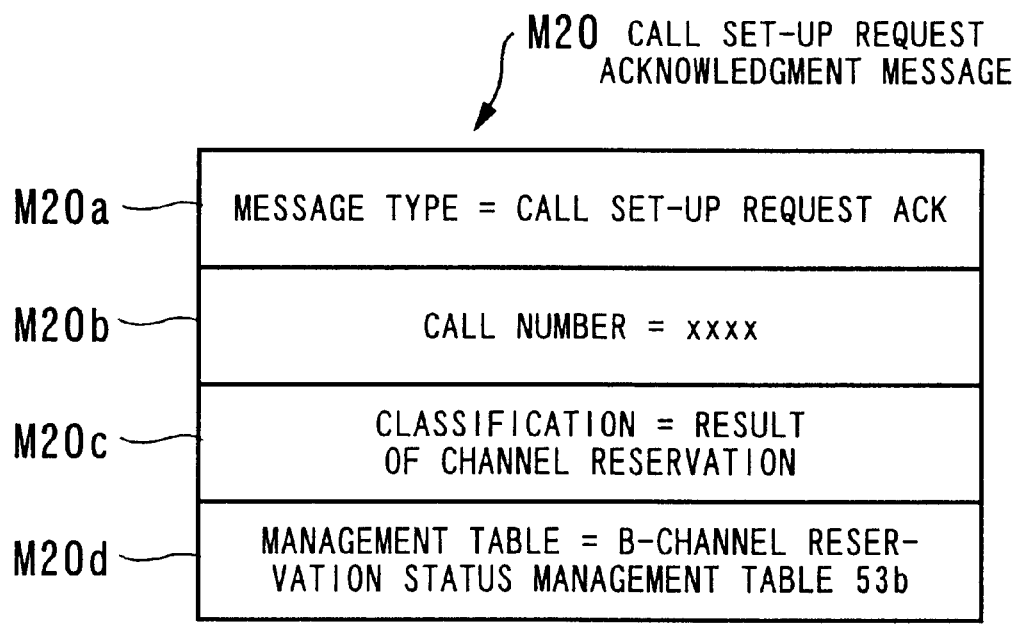
FIG. 12 is a diagram which shows the contents of a call set-up request acknowledgment message.

FIG. 12 shows the contents of the call set-up request acknowledgment message M20, which consists of a message type field M20a, a call number field M20b, a classification field M20c, and a management table field M20d. More specifically, the message type field M20a contains a code representing "call set-up request acknowledgment" messages, and the call number field M20b indicates a specific call number "xxxx." The classification field M20c indicates that this message is intended to return the result of the channel reservation conducted. The management table field M20d contains a B-channel reservation status management table 53b.

Now, the following section will explain a reservation restriction unit. The reservation restriction unit is disposed in the recipient-side channel reservation controller 20. In response to a reservation request message, it controls B-channel reservation in accordance with a reservation restriction condition that has been registered in advance.

FIG. 13 shows a B-channel reservation restriction management table 53c stored in the channel reservation control data storage unit 53. Being prepared for each ISDN transmission line containing (23B+1D) channels, for example, this B-channel reservation restriction management table 53c defines the maximum number of B-channels subjected to the channel reservation. When this B-channel reservation restriction management table 53c is registered in the management table field M20d of a call set-up request acknowledgment message M20, the reservation restriction unit is activated to make the restriction take effect. This feature adds more functionality and flexibility to the channel reservation control system 1 of the present invention.

Now, the following section explains a reservation cancellation unit. Recall here that the number of required B-channels may vary with time. When the number of B-channels determined by the channel allocation unit 11 becomes smaller than the number of B-channels being reserved, the reservation cancellation unit partly cancels the established B-channel reservation so that the excessive B-channels will be released for other usage.

Figure 14:
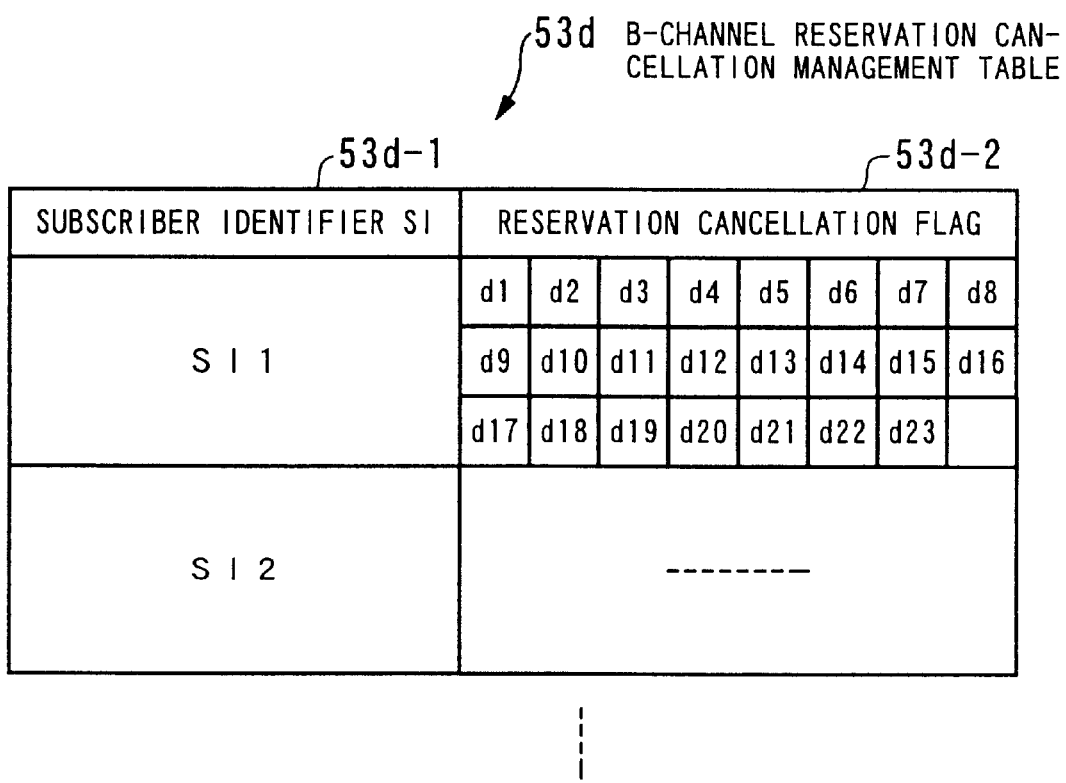
FIG. 14 is a diagram which shows a B-channel reservation cancellation management table.

FIG. 14 shows a B-channel reservation cancellation management table 53d, which is stored in the channel reservation control data storage unit 53. This B-channel reservation cancellation management table 53d manages reservation cancellation flags 53d-2 for each group of subscribers that are identified by the subscriber identifier SI 53d-1. More specifically, each reservation cancellation flag di shown in FIG. 14 corresponds to a B-channel Bi, where i is an integer ranging from 1 to 23. This reservation status flag bi is set to "1" when the cancellation of the corresponding B-channel Bi is being requested; otherwise, the flag bi remains "0." When the B-channel reservation cancellation management table 53d is found in the management table field M10g of a call set-up request message M10, the reservation restriction unit is activated to cancel the reservation of B-channels in accordance with the table 53d. This feature allows excessive B-channels to be released from the pool, thus enabling more efficient use of transmission resources.

Now, the following section explains a reservation continuation unit. When a reserved B-channel is consumed to set up a call and when the call is terminated, this reservation continuation unit secures the same B-channel again for continuous reservation.

Figure 15:
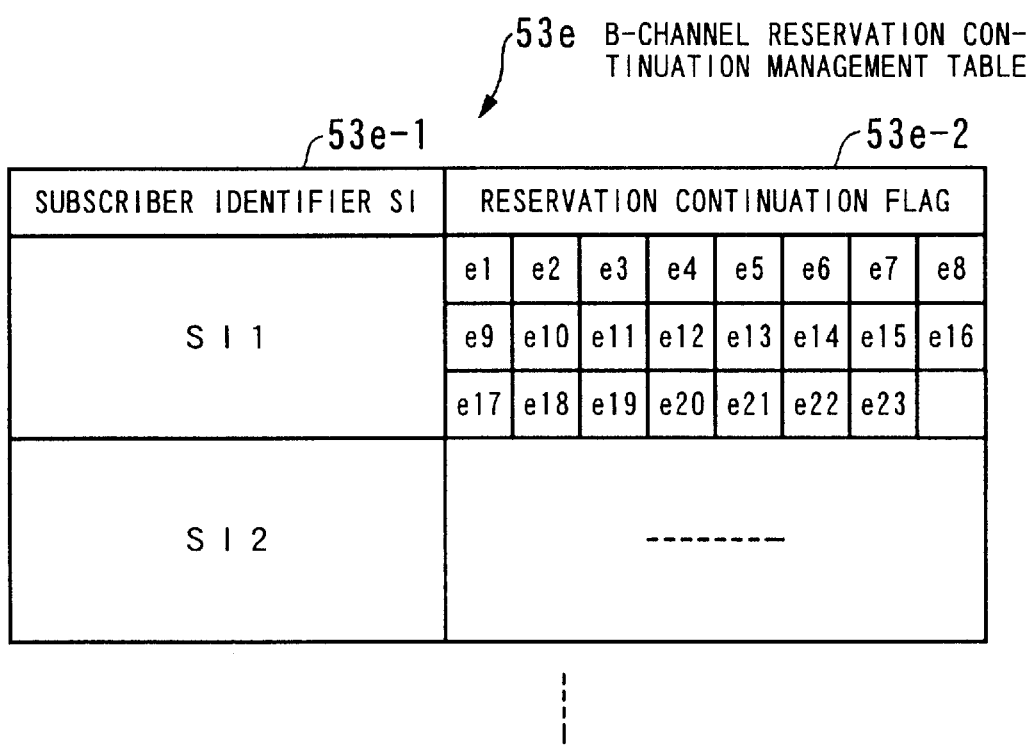
FIG. 15 is a diagram which shows a B-channel reservation continuation management table.

FIG. 15 shows a B-channel reservation continuation management table 53e, which is stored in the channel reservation control data storage unit 53. This B-channel reservation continuation management table 53e manages reservation continuation flags 53e-2 for each group of subscribers that are identified by the subscriber identifier SI 53e-1. More specifically, each reservation continuation flag ei shown in FIG. 15 is associated with a B-channel Bi, where i is an integer ranging from 1 to 23. The flag ei, when it is set to "1," indicates that the reservation continuation of the corresponding B-channel Bi is being requested; if no continuation is requested, the flag ei remains "0." The reservation continuation unit is activated when the B-channel reservation continuation management table 53e is seen in the management table field M10g of a call set-up request message M10. This feature permits the system to freely control the duration of reservation.

As described above, the channel reservation control system 1 of the present invention is arranged to make B-channel reservations for a specific group of subscribers through interaction between the originator-side channel reservation controller 10 and the recipient-side channel reservation controller 20 which are linked by ISDN transmission lines 30. This system configuration permits data channels to be reserved in an appropriate manner to ensure the connection set-up operations in telecommunications service features which have to continually handle a number of incoming calls, as in ACD services.

Furthermore, the proposed control system tunes the number of reserved channels each time a call set-up request is processed. This function makes it possible to maintain an appropriate number of B-channels for a specific group of subscribers. Moreover, the proposed system allows control messages to specify various management tables designed for channel reservation control. This feature adds more flexibility to the control system.

Figure 16:
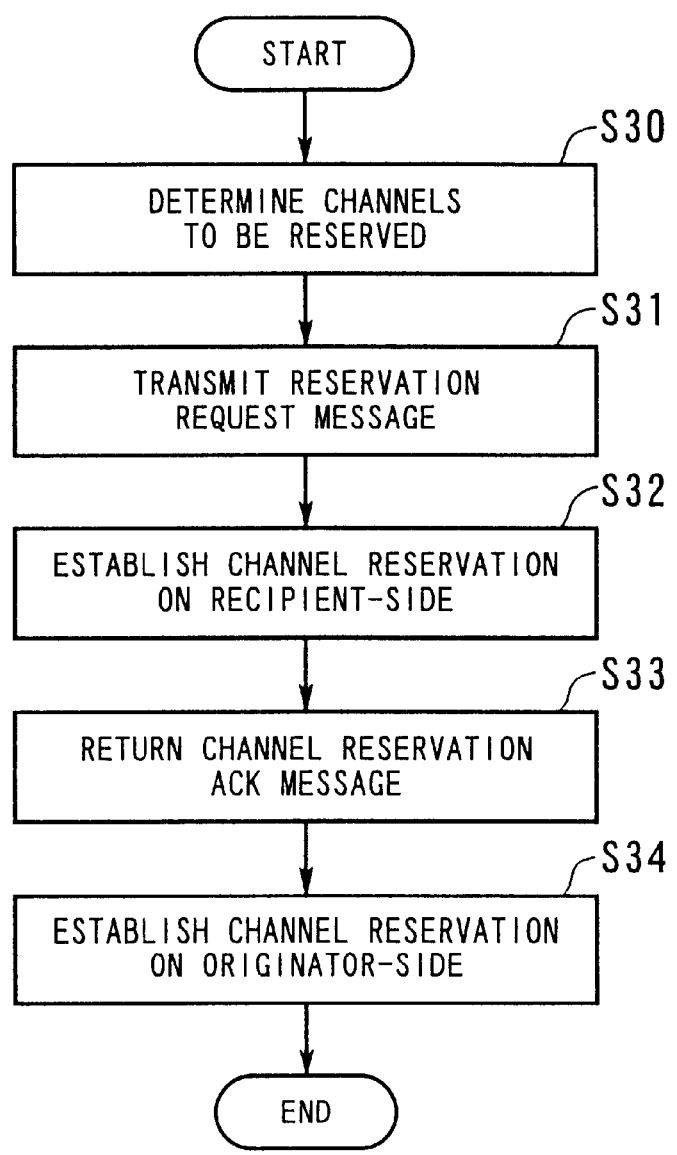
FIG. 16 is a flowchart which shows a channel reservation control method according to the present invention.
Figure 17:
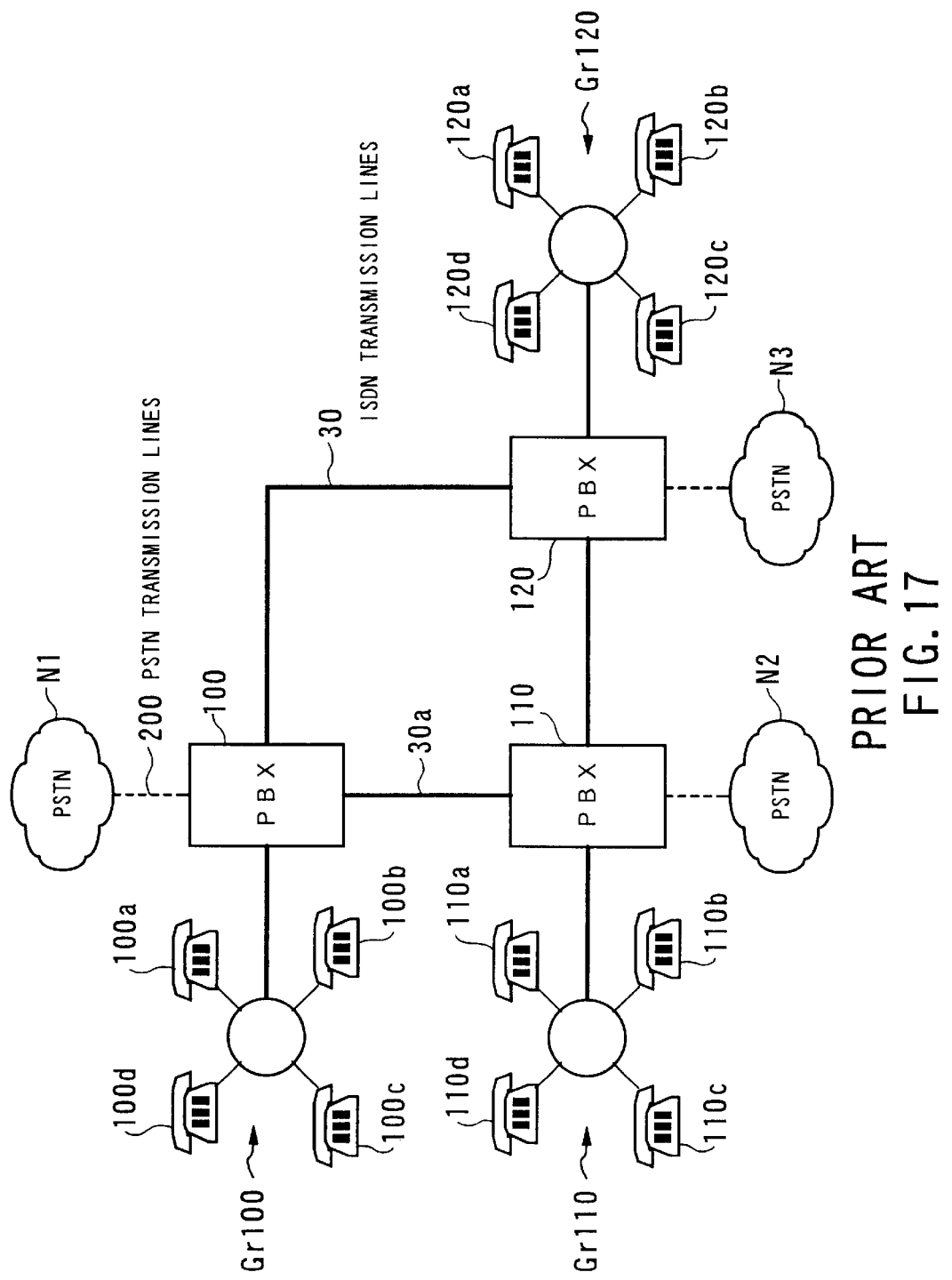
FIG. 17 is a diagram which shows an example of conventional ACD service facilities.

Referring now to FIG. 16, the next section will present a method of controlling channel reservation. FIG. 16 is a flowchart which shows a process executed in accordance with the channel reservation control method of the present invention.

(S30) The number of required data channels is determined on the side of call originators for convenience of a specific group of subscribers.

(S31) Provisional reservation of data channels as many as the determined number is made on the side of call originators. A reservation request message is issued to the side of call recipients.

(S32) Upon receipt of the reservation request message, the requested data channels are reserved on the side of call recipients for exclusive use by the specific group of subscribers.

(S33) The result status of the channel reservation is reported to the side of call originators.

(S34) Upon receipt of the result status message from the side of call recipients, the requested data channels are secured on the side of call originators for exclusive use by the specific group of subscribers.

The above discussion will now be summarized as follows. The channel reservation control method and system of the present invention make reservations for data channels at the both ends of the channels: on the side of call originators and on the side of call recipients. It is therefore possible to reserve data channels in an appropriate manner to ensure the connection set-up operations performed in a telecommunications service feature which has to continually handle a number of incoming calls, as in ACD services.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system for use in an ISDN network, which controls reservation of data channels to be used for automatic distribution of incoming calls, comprising:
    (a) an originator-side channel reservation controller comprising
        channel allocation means for determining the number of data channels to be reserved for a specific group of subscribers who may use the data channels,
        reservation request transmission means for making a provisional reservation for as many data channels as determined by said channel allocation means and transmitting a reservation request message to request reservation of the data channels, and
        originator-side reservation means for establishing channel reservation on the side of call originators by securing the data channels for exclusive use by the specific group of subscribers, in response to a channel reservation acknowledgement message; and
    (b) a recipient-side channel reservation controller linked to said originator-side channel reservation controller through the ISDN network, comprising
        recipient-side reservation means for establishing channel reservation on the side of call recipients by securing the data channels for exclusive use by the specific group of subscribers, in response to the reservation request message sent from said reservation request transmission means, and
        channel reservation acknowledgement means for transmitting the channel reservation acknowledgement message to said originator-side reservation means to report a result status of the channel reservation made by said recipient-side reservation means.

2. The system according to claim 1, wherein said channel allocation means holds an initiating condition that has been previously defined as a condition to start the channel reservation, and determines the number of required data channels when the initiating condition is satisfied.

3. The system according to claim 1, wherein said channel allocation means determines the number of required data channels in response to each call set-up request received from the specific group of subscribers.

4. The system according to claim 1, wherein said recipient-side channel reservation controller further comprises reservation restriction means for restricting, in response to the channel reservation request message, the reservation of the data channels in accordance with a reservation restriction condition that has been previously defined.

5. The system according to claim 1, wherein said reservation request transmission means transmits the reservation request message, when the number of data channels determined by said channel allocation means is greater than the number of data channels being reserved.

6. The system according to claim 1, said originator-side channel reservation controller further comprises reservation cancellation means, activated when the number of data channels determined by said channel allocation means is smaller than the number of data channels being reserved, for canceling the reservation of excessive data channels.

7. The system according to claim 1, further comprising another recipient-side channel reservation controller that has been registered as an alternative destination of the incoming calls,
    wherein said originator-side channel reservation controller further comprises alternative route reservation means, activated when said recipient-side channel reservation controller has failed to reserve a sufficient number of data channels as determined by said channel allocation means, for reserving other data channels extending to said another recipient-side channel reservation controller to compensate for the insufficient data channels.

8. The system according to claim 1, said originator-side channel reservation controller further comprises reservation continuation means, activated when one of the reserved data channels was consumed to set up a call and the call has been terminated, for securing the same data channel again for continuous reservation.

9. An originator-side channel reservation controller for use in an ISDN network, which controls reservation of data channels to be used for automatic distribution of incoming calls, comprising:
    channel allocation means for determining the number of data channels to be reserved for a specific group of subscribers who may use the data channels;
    reservation request transmission means for making a provisional reservation for as many data channels as determined by said channel allocation means, and transmitting a reservation request message to request reservation of the data channels; and
    originator-side reservation means for establishing channel reservation on the side of call originators by securing the data channels for exclusive use by the specific group of subscribers, in response to a channel reservation acknowledgement message that is returned when the data channels are reserved on the side of call recipients.

10. A recipient-side channel reservation controller for use in an ISDN network, which controls reservation of data channels to be used for automatic distribution of incoming calls, comprising:
    recipient-side reservation means for establishing channel reservation on the side of call recipients by securing the data channels for exclusive use by a specific group of subscribers, in response to a reservation request message sent from the side of call originators; and
    channel reservation acknowledgement means for transmitting a channel reservation acknowledgement message to the side of call originators to report a result status of the channel reservation made by said recipient-side reservation means.

11. A method of controlling reservation of data channels on an ISDN network for automatic distribution of incoming calls, comprising the steps of:
    (a) determining the number of data channels to be reserved on the side of call originators to handle incoming calls from a specific group of subscribers;
    (b) making a provisional reservation of as many data channels as determined in said step (a) and issuing a reservation request message to the side of call recipients;
    (c) reserving the requested data channels on the side of call recipients for exclusive use by the specific group of subscribers, in response to the reservation request message;

(d) sending a result status message to inform the side of call originators about the data channels that have been reserved in said step (c);

(e) establishing channel reservation on the side of call originators by securing the data channels for exclusive use by the specific group of subscribers, in response to the result status message received from the side of call recipients.

* * * * *